May 2, 1950 W. J. WILSON 2,506,532
HOG AND CATTLE SKINNING TABLE
Filed Feb. 25, 1949 2 Sheets-Sheet 1

Wayne J. Wilson
INVENTOR.

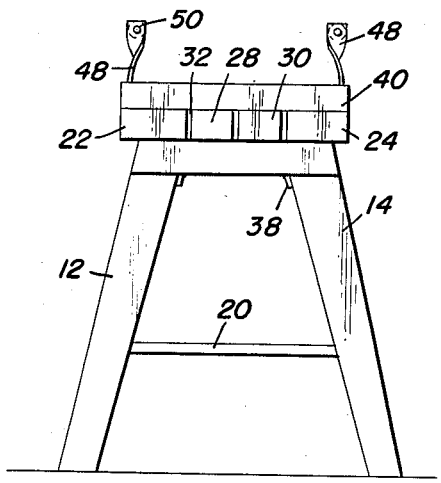
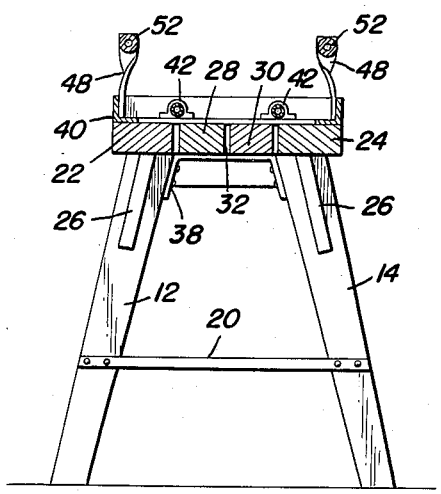
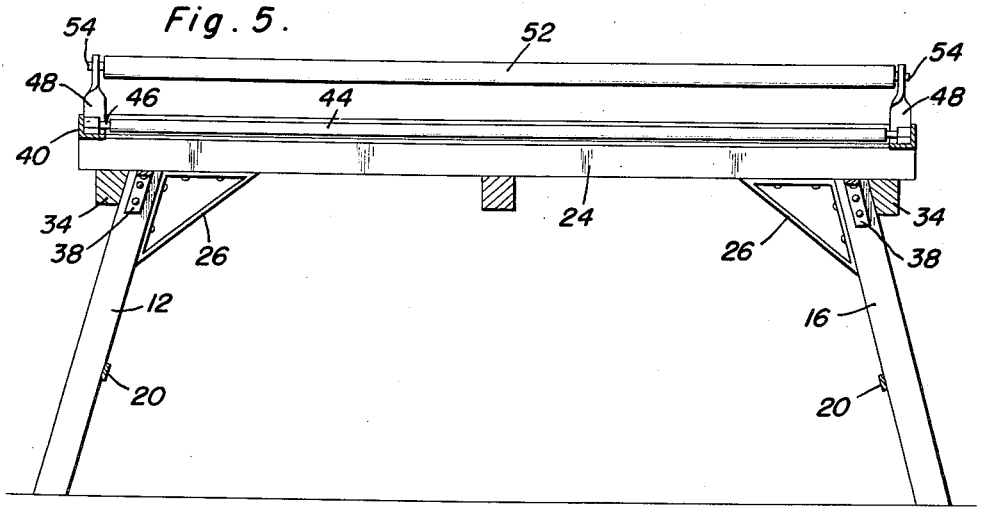
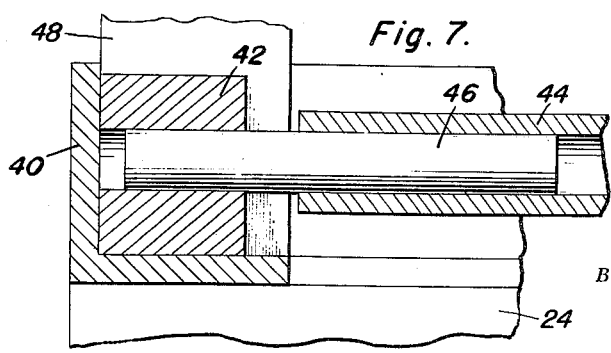

Patented May 2, 1950

2,506,532

UNITED STATES PATENT OFFICE 2,506,532

HOG AND CATTLE SKINNING TABLE

Wayne J. Wilson, Morning Sun, Iowa

Application February 25, 1949, Serial No. 78,326

5 Claims. (Cl. 17—44)

This invention relates to a novel device the primary object of which is to assist the butcher in skinning the hogs, cattle and other animals.

Another important object of this invention is to provide a table including two sets of vertically spaced rollers for holding the animal in the most advantageous position for skinning. The position of these vertically spaced sets of rollers allows the butcher to turn the animal with very little effort so that he can skin the back of the animal.

Yet another object of this invention is to provide a device of the character described in which the positioning of the spaced rollers is such that the animal is held at the most comfortable height during the skinning operation.

And a further object of this invention is to provide a device of the character described including drainage means provided in the table top so that the carcass of the animal is kept clean and sanitary during the complete skinning operation.

These, together with various ancillary objects and features of the invention which will later become apparent as the following description proceeds are attained by the device, a preferred embodiment of which has been illustrated by way of example only in the accompanying drawings, wherein:

Figure 3 is an end elevational view of the device;

Figure 4 is a sectional view taken substantially on a plane of section line 4—4 of Figure 2;

Figure 5 is a sectional view taken substantially on a plane of section line 5—5 of Figure 1;

Figure 7 is an enlarged sectional view taken substantially on a plane of section line 7—7 of Figure 1.

Specific reference is now made to the drawings. In the several views in the accompanying drawings and in the following specification reference characters indicate corresponding elements throughout.

Indicated generally at 10 is a table having legs 12, 14, 16 and 18. While the legs may be perpendicularly extending from the floor, it is preferred that they be upwardly converging. The legs 12 and 14 as well as the legs 16 and 18 are interconnected by suitable brace bars 20.

Figure 1:
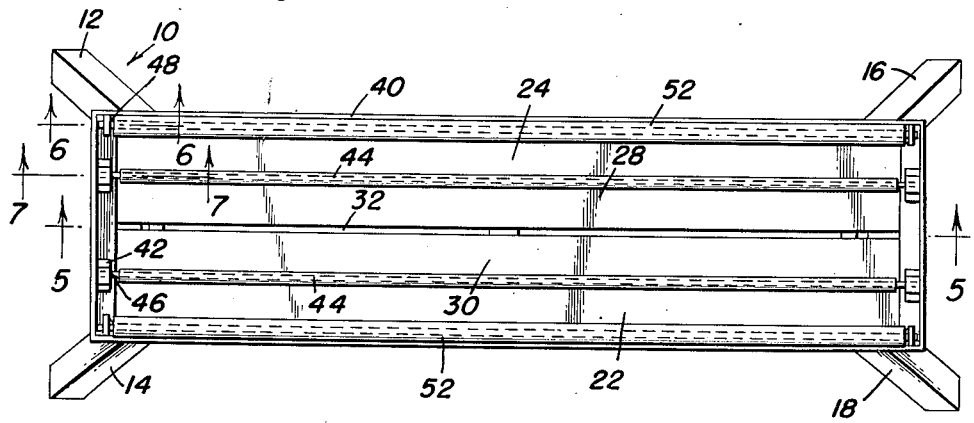
Figure 1 is a top plan view of the device.
Figure 2:
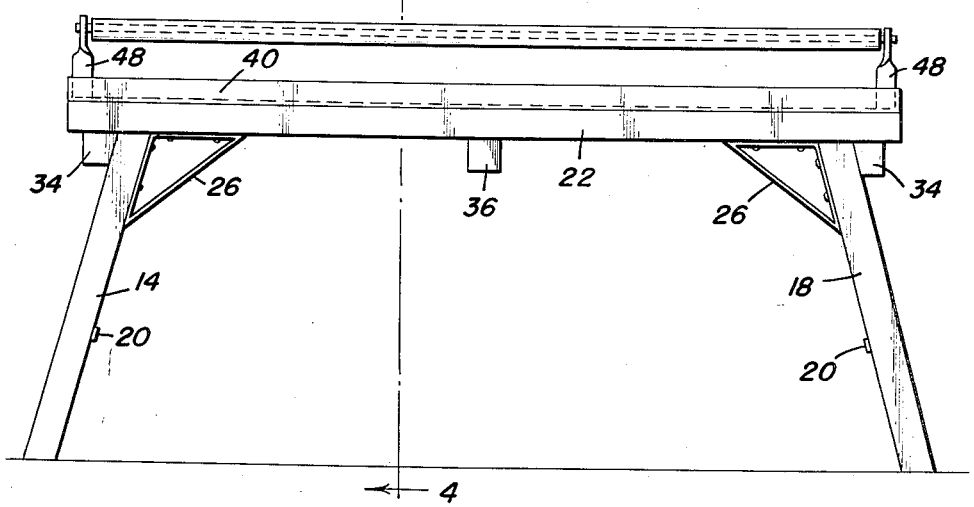
Figure 2 is a side elevational view of the device.
Figure 6:
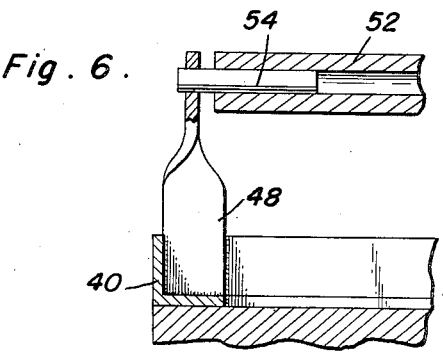
Figure 6 is an enlarged sectional view taken substantially on a plane of section line 6—6 of Figure 1.

Supported on the legs 12 and 16 and also on the legs 14 and 18 are longitudinal blocks 22 and 24 and suitable braces 26, in the form preferably of triangular metal frames, are secured by appropriate bolts or screws to the underside of the blocks 22 and 24 and the legs of the table as shown clearly in Figures 2 and 5.

Between the blocks 22 and 24 are positioned longitudinally extending transversely spaced inner blocks or slats 28 and 30 forming drainage slots 32 therebetween. To support the inner spaced blocks 28 and 30 and also to serve as additional supports for the outer blocks 22 and 24, transversely extending blocks 34 are provided which are secured by any suitable means, such as by adhesion, to the outer surfaces of the legs and the under surfaces of all of the blocks. As an additional support, a further transversely extending block 36 is secured to the under surface of all of the blocks 22, 24, 28 and 30 substantially at the center thereof. It will be here understood that the blocks 22, 24, 28 and 30 form the top of the table.

As additional support for the inner blocks 28 and 30 and also serving as further brace means for the legs, substantially U-shaped braces 38 are secured by appropriate bolts or screws to the under surfaces of the blocks 28 and 30 and to the inner surfaces of the legs 12 and 14 and the legs 16 and 18.

Secured by any appropriate means to the blocks forming the table top is a substantially rectangular angle iron 40 which extends around the periphery of the table top as shown clearly in the drawings. Further secured to the horizontal leg portions of the angle iron at or adjacent the ends of the table are bearing collars 42. A plurality of transversely spaced longitudinally extending rollers 44 are provided, preferably in the form of pipes, which carry stub shafts 46 at their opposite ends that are received in the bearings 42 at the opposite ends of the table. It will be understood that the shaft 46 may extend throughout the entire length of the pipes or may merely be stub shafts as shown in the drawings. It will be further understood that the stub shafts may be non-rotatably retained in the bearings 42 and the pipes 44 will be rotatable on the shaft 46, or conversely the pipes 44 may be non-rotatably secured to the stub shafts 46 which are, in turn, rotatably journaled within the bearings 42.

Secured as by welding to the horizontal legs and the vertical legs of the angle iron 40 at or adjacent its corners are upstanding lugs 48 which are preferably slightly inclined towards the central longitudinal axis of the table and which are also preferably twisted as shown in the drawings. The free ends of the lugs are provided with apertures 50. A pair of transversely spaced longitudinally extending rollers 52, preferably in the form of pipes, are provided which carry at their opposite ends stub shafts 54 that are, in turn, received in the apertures 50 of each of the lugs 48. As mentioned with respect to the rollers 44 hereinabove, the rollers 52 may be rotatable about the stub shafts 54 which are non-rotatably retained in the apertures 50, or conversely the rollers 52 may be non-rotatably secured to the stub shafts 54 which are, in turn, rotatably journaled within the apertures 50. Also, the stub shafts may be replaced with elongated shafts that extend entirely through the pipes 52.

Thus it will be seen that a novel table is provided with vertically spaced sets of rollers and drainage slots therebelow for readily and easily supporting an animal at its proper height to allow the butcher to skin the animal and turn the animal on its back with a minimum of effort.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A hog and cattle skinning device comprising a table having a table top including drainage means, a first set of transversely spaced longitudinal rollers, means for supporting said rollers on said table top, a second set of transversely spaced longitudinal rollers, and means for supporting said second set of rollers above said first set of rollers.

2. The combination of claim 1, wherein said drainage means includes transversely spaced slats forming a portion of said table top.

3. The combination of claim 1, wherein said first-named supporting means includes angle irons carried by said table top, bearings secured to said angle irons adjacent the opposite ends of said table, and stub shafts carried by said first set of rollers journaled in said bearings.

4. The combination of claim 3, wherein said second-named supporting means includes upstanding apertured bearing lugs secured to said angle irons adjacent the corners of said table and stub shafts carried by said second set of rollers journaled in said apertured lugs.

5. The combination of claim 4, wherein said drainage means includes transversely spaced slats forming a portion of said table top.

WAYNE J. WILSON.

No references cited.